United States Patent [19]

Arimoto et al.

[11] Patent Number: 4,770,507
[45] Date of Patent: Sep. 13, 1988

[54] PRISM OPTICS AND OPTICAL INFORMATION PROCESSING APPARATUS

[75] Inventors: Akira Arimoto, Musashimurayama; Shigeru Nakamura, Hachioji, both of Japan

[73] Assignees: Hitachi, Ltd.; Hitachi Koki Co., Ltd., both of Tokyo, Japan

[21] Appl. No.: 700,184

[22] Filed: Feb. 11, 1985

[30] Foreign Application Priority Data

Mar. 9, 1984 [JP] Japan ................................. 59-45135
May 2, 1984 [JP] Japan ................................. 59-87902

[51] Int. Cl.$^4$ ...................... G02B 13/10; G02B 26/08; G02B 5/04
[52] U.S. Cl. ..................................... 350/421; 350/6.4; 350/6.8; 350/286
[58] Field of Search ................... 350/286, 421, 6.4, 6.8

[56] References Cited

U.S. PATENT DOCUMENTS

| | | | |
|---|---|---|---|
| 2,780,140 | 2/1957 | Luboshez | 350/421 |
| 2,792,751 | 5/1957 | Coleman | 350/421 |
| 2,855,819 | 10/1958 | Luboshez | 350/421 |
| 4,017,160 | 4/1977 | Betensky | 350/421 |
| 4,084,881 | 4/1978 | Hirabayashi et al. | 350/421 X |
| 4,203,652 | 5/1980 | Hanada | 350/421 X |
| 4,333,173 | 6/1982 | Yonezawa et al. | 350/286 |

*Primary Examiner*—John K. Corbin
*Assistant Examiner*—Scott J. Sugarman
*Attorney, Agent, or Firm*—Antonelli, Terry & Wands

[57] ABSTRACT

An optical system for converting the shape of a light beam by making use of refraction of prisms comprises a prism optic which includes a complex prism constituted by combination of at least two types of prisms made of materials differing from each other in respect to dispersion of refractivity. An optical information processing apparatus includes the optical system employing the prisms. Geometric optical properties of the optical system are insusceptible to being changed irrespective of changes in wavelength of the light beam brought about by dispersion in oscillation wavelength of a light source, change in the course of time lapse, change in ambient temperature and/or change in emitted light energy. With the optical system, information processing is realized which is insusceptible to the influence of the change in wavelength of the light beam.

23 Claims, 5 Drawing Sheets

PRISM OPTICS AND OPTICAL INFORMATION PROCESSING APPARATUS

BACKGROUND OF THE INVENTION

The present invention generally relates to an optical system employing prisms and an optical information processing system incorporating such optical system. More particularly, the invention concerns an optical system employing prisms which is suited for modifying or changing the shape of a light beam having a two-dimensional distribution as well as an optical information processing apparatus in which the optical system employing prisms are used.

As the optical system for modifying or varying or converting the cross-sectional shape of a light beam, there have hithertofore been known two types of optical systems, i.e. an optical system in which a pair of cylindrical lenses are disposed confocally, wherein magnification power of the optical system is adjusted in dependence on the ratio of the focal lengths of the cylindrical lenses (e.g. U.S. Pat. No. 4,203,652), and an optical system in which a triangle prism is used and the difference existing between the angle of incidence and the output angle of the light beam due to refraction of the prism is made use of for conversion of the shape of the light beam (e.g. U.S. Pat. No. 4,333,173). The present invention concerns an improvement of the last mentioned type optical system.

FIG. 1 of the accompanying drawings illustrates refraction of a light beam by a triangle prism, in which a light beam is incident on one face of a triangle prism along a direction inclined relative to the one face. Referring to the figure, when the incident angle (i.e. angle of incidence) and the output angle at the boundary between air and the prism media are represented by $\theta_1$ and $\theta_2$, respectively, the following relation applies valid (in accordance with Snell's law).

$$\sin \theta_1 = n \cdot \sin \theta_2 \quad (1)$$

where n represents the refractive index of the medium or material constituting the triangle prism.

Further, magnification ratio M of the beam diameter brought about by the refraction is given by $$M = D_2/D_1 = \cos \theta_2 / \cos \theta_1 \quad (2)$$

where $D_1$ and $D_2$ represent the diameters of the incident beam and the output beam, respectively. By making use of the relation mentioned above, modification or conversion of the beam shape can be realized. On another prism face, opposite to the inclined one, the light beam is incident or outputted in a direction perpendicular to said other prism face, as seen in FIG. 1, so that the ratio of the beam diameter generated at the inclined face undergoes no change at the face opposite thereto. In case the beam leaves the prism in the direction perpendicular to the output face thereof, as described above, there apply valid among the incident angle $\theta_1$, apex angle $\phi$, refractive index n and the magnification ratio of beam diameter M the following relations:

$$\sin \phi = \sqrt{\frac{M^2 - 1}{M^2 n^2 - 1}} \quad (3)$$

$$\cos \theta_1 = \sqrt{\frac{n^2 - 1}{M^2 n^2 - 1}} \quad (4)$$

provided that $M \geq 1$.

In this connection, it is noted that when the magnification ratio M of the beam diameter is excessively large (e.g. about 3 or more), the reflection factor of the prism at the incident face will become too large to be useful in practical applications. Under the circumstance, with the aim of realizing a greater magnification ratio of beam diameter while evading the above problem, an attempt has been proposed in which a plurality of prisms made of a material exhibiting the same refractive index are used to constitute a prism system. By way of example, FIG. 2 of the accompanying drawings shows an optical system in which a pair of prisms 1 and 2 are employed.

The relations mentioned above are invariable so far as the wavelength of the light beam remains constant. However, when the wavelength is varied, the refractive index of the medium constituting the triangle prism undergoes variation or change, bringing about a corresponding change in the output angle $\theta_2$ of the light beam, which in turn exerts significant influences to the devices and instruments used in combination with the optical system, to a great disadvantage. The variation or change in the wavelength of the light beam is ascribable to various causes such as dispersion of wavelength of the light emitted by a light source such as, for example, a semiconductor laser, change of the emitted wavelength in the course of time lapse, change in the ambient temperature, change in the light output energy and the like.

SUMMARY OF THE INVENTION

In view of the state of the prior art described above, it is an object of the present invention to provide an optical system employing prisms as well as an optical information processing apparatus incorporating the optical system in which the disadvantages and problems of the prior art systems described above are eliminated and which undergoes no change in respect to the geometric optical properties thereof independent of changes in the wavelength of the incident light beam.

For accomplishing the above and other objects which will be more apparent as the description proceeds, there is proposed, according to a general aspect of the present invention, an optical prism system which includes a complex prism unit composed of at least two types of prisms made of materials exhibiting different dispersion of refractivity, which materials are so selected that the output angle of a light beam leaving the optical prism system can remain substantially constant independent of variation or change in the wavelength of the light beam. According to another aspect of the invention, there is provided an optical information processing apparatus in which the optical prism system mentioned above is employed.

BRIEF DESCRIPTION OF THE DRAWINGS

The present invention will be apparent from the following detailed description taken in conjunction with the accompanying drawings, in which.

DESCRIPTION OF THE PREFERRED EMBODIMENT

Figure 1:
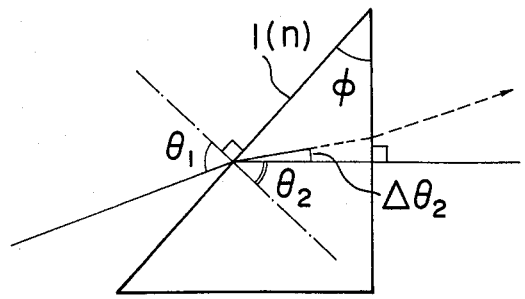
FIGS. 1 and 2 are views for illustrating functions of hitherto known optical systems employing prisms.
Figure 2:
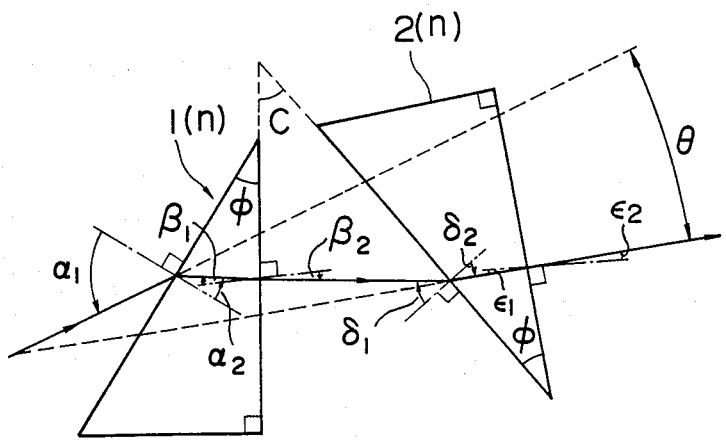

Before entering into description of the preferred embodiments of the invention, examination will be made on the change in the output angle of a light beam leaving an optical prism system which is brought about in dependence on change or variation in the wavelength of the incident light beam, by taking as an example the optical prism system shown in FIG. 2.

Referring to the figure, it is assumed that the pair of prisms having a same refractive index n and respective apex angles $\phi$ equal to each other (i.e. having the same configuration) are disposed such that the incident angle $\alpha_1$ of a light beam at the prism 1 is equal to the incident angle $\delta_1$ at the other prism 2 while the output angle is perpendicular to the output face in both of the prisms 1 and 2. From the Snell's law, the following relations apply valid:

$$\sin \alpha_1 = n \sin \alpha_2 \quad (5)$$

$$n \sin \beta_1 = \sin \beta_2 \quad (6)$$

$$\sin \delta_1 = n \sin \delta_2 \quad (7)$$

$$n \sin \epsilon_1 = \sin \epsilon_2 \quad (8)$$

Further, $$\phi = \alpha_2 + \beta_1 \quad (9)$$

$$\phi = \delta_2 + \epsilon_1 \quad (10)$$

$$\theta = \delta_1 - \beta_2 \quad (11)$$

$$\alpha_1 = \delta_1 \quad (12)$$

When changes of angles $\alpha_i$, $\beta_i$, $\delta_i$ and $\epsilon_i$ (where i=1, 2) brought about by a change $\Delta\lambda$ in the wavelength are represented by $\Delta\alpha_i$, $\Delta\beta_i$, $\Delta\delta_i$ and $\Delta\epsilon_i$, respectively, differentiation of the equations (5) and (7) results in the following expressions:

$$\Delta\alpha_2 = -\frac{\Delta n}{n} \tan\phi \quad (13)$$

$$\Delta\delta_2 = \frac{\cos\delta_1 \cdot \Delta\delta_1 - \Delta n \sin\delta_2}{n \cos\delta_2} \quad (14)$$

Through differentiation of the equations (6) and (8) and application of the condition for the perpendicular output of the light beam (i.e. $\beta_1 = \beta_2 = 0$ and $\epsilon_1 = \epsilon_2 = 0$), the following expressions are derived:

$$n\Delta\beta_1 = \Delta\beta_2 \quad (15)$$

$$n\Delta\epsilon_1 = \Delta\epsilon_2 \quad (16)$$

Further, differentiation of the equations (9), (10) and (11) results in $$0 = \Delta\alpha_2 + \Delta\beta_1 \quad (17)$$

$$0 = \Delta\delta_2 + \Delta\epsilon_1 \quad (18)$$

$$0 = \Delta\delta_1 - \Delta\beta_2 \quad (19)$$

By substituting the term $\Delta\alpha_2$ of the expression (17) with the expression (13) to determine $\Delta\beta_1$ with the result of determination being placed in the expression (15), $\Delta\beta_2$ can be determined. On the basis of the determined $\Delta\beta_2$, the change $\Delta\delta_1$ is determined in accordance with the expression (14) to thereby determine $\Delta\delta_2$. Further, on the basis of the determined $\Delta\delta_2$, the change $\Delta\epsilon_1$ is determined in accordance with the expression (18), the result being placed in the expression (16) to determine $\Delta\epsilon_2$ which is then given by the following expression:

$$\Delta\epsilon_2 = \Delta n \tan\phi \left(1 - \frac{\cos\delta_1}{\cos\phi}\right) \quad (20)$$

Now considering the second prism 2, the condition of the perpendicular output is satisfied by $\phi = \delta_2$. Accordingly, the above expression (20) can be rewritten by taking account of the expression (2) as follows:

$$\Delta\epsilon_2 = \Delta n \tan\phi (1 - (1/M)) \quad (21)$$

On the assumption that a glass material commercially available under trade name "SF-11" is used as the medium constituting the prism and that the magnification ratio M equal to 2 is to be realized, $\Delta\epsilon_2$ will be determined through calculation. The refractive index of the prism medium "SF-11" undergoes changes in dependence on changes in the wavelength of the light beam in the manner listed in the following table 1.

TABLE 1

| Wavelength (nm) | Refractive Index n |
|---|---|
| 800 | 1.764710 |
| 830 | 1.763066 |
| 860 | 1.761582 |

As will be seen, in case the change of wavelength $\Delta\lambda$ is equal to 4 nm, the corresponding change $\Delta n$ of the refractive index amounts to 0.000209. On the other hand, for the magnification ratio M equal to 2 with refractive index corresponding to the wavelength $\lambda = 830$ nm, it is derived from the expressions (3) and (4) that $\alpha_1 = \delta_1 = 64.56°$ and that $\phi = 30.79°$. On the basis of determined $\Delta n$, $\phi$ and M, it is calculated that $\Delta\epsilon_2 = 0.00356°(\Delta\lambda = 4$ nm) from the expression (21).

When the optical prism system under consideration is employed, for example, in an optical disk apparatus, a change in the output angle $\Delta\epsilon_2$ brought about by change in the wavelength will appear as a positional change or deviation of a light spot focussed on a disk surface. In case a focussing lens having a focal length of 4.5 mm, for example, is employed, the positional change or deviation $\Delta d$ of the focussed spot due to the change in the output angle is calculated as follows:

$$\Delta d = f \cdot \tan \epsilon_2 = 0.28 \, \mu m$$

Such positional change of the focussed spot is undesirable for the detection of focussing deviation and/or tracking deviation because of its influence exerted to the offset.

In the light of the foregoing, the present invention teaches that a complex prism composed of at least two types of prisms made of materials differing from each other with respect to the dispersion of refractivity is used as the prism constituting the concerned optical system to thereby make the output angle of the light beam leaving the optical system be substantially constant or invariable independent of the changes in the wavelength of the light beam.

Figure 3:
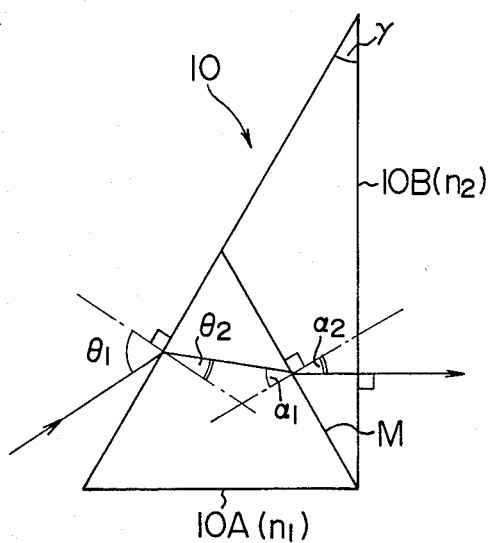
FIG. 3 is a view showing an optical prism system according to an exemplary embodiment of the present invention.

Now, description will first be made on an exemplary embodiment of the complex prism realized by bonding two types of prisms made of materials which differ from each other in the dispersion of refractivity (i.e. change of the refractive index in dependence on change in the wavelength of the incident light beam). FIG. 3 is a view showing an exemplary embodiment of the optical prism system according to the invention, in which two types of prisms are bonded together to constitute a complex prism.

Referring to FIG. 3, a reference numeral 10 denotes the complex prism which is constituted by a first prism 10A made of a first material of which refractive index is represented by $n_1$ and a second prism 10B made of a second material having a refractive index $n_2$, both prisms 10A and 10B being bonded together along a plane M.

In the following description, it is assumed that the light beam traveling in the air impinges on the complex prism 10 at the angle of incidence $\theta_1$ and leaves the complex prism in the direction perpendicular to the output or exit face thereof. In order that the output light beam leaves the complex prism in the direction perpendicular to the output or exit face thereof, arrangement must be made such that the angle indicated by $\alpha_2$ in FIG. 3 undergoes no changes regardless of changes in the wavelength of the light beam.

From the Snell's law, the following expressions apply valid:

$$\sin \theta_1 = n_1 \sin \theta_2 \quad (22)$$

$$n_1 \sin \alpha_1 = n_2 \sin \alpha_2 \quad (23) \text{ and}$$

$$\theta_2 = \alpha_1 = C \text{ (constant)} \quad (24)$$

When the changes in the refractive indexes $n_1$, $n_2$, angles $\alpha_1$, $\alpha_2$, $\theta_2$ and others brought about by a change in the wavelength of the incident light beam are represented by $\Delta n_1$, $\Delta n_2$, $\Delta \alpha_1$, $\Delta \alpha_2$, $\Delta \theta_2$ and so forth, respectively, (with the assumption that the angle $\theta_1$ is constant), the change $\Delta n_1$ is determined from the expression (22) as follows:

$$\Delta n_1 = -\frac{n_1}{\tan \theta_2} \Delta \theta_2 \quad (25)$$

Further, from the expression (23), the following expression can be derived.

$$\Delta n_1 \sin \alpha_1 + n_1 \cos \alpha_1 \Delta \alpha_1 - \Delta n_2 \sin \alpha_2 = n_2 \cos \alpha_2 \Delta \alpha_2 \quad (26)$$

Since it is necessary that $\Delta \alpha_2 = 0$ for any change in the wavelength, the expression (26) must satisfy the following condition:

$$\Delta n_1 \sin \alpha_1 + n_1 \cos \alpha_1 \Delta \alpha_1 - \Delta n_2 \sin \alpha_2 = 0 \quad (27)$$

Further, differentiation of both sides of the equation (24) results in:

$$\Delta \theta_2 = -\Delta \alpha_1 \quad (28)$$

Accordingly, from the expressions (23) and (27), $$\sin \alpha_1 (\Delta n_1 - \Delta n_2 (n_1/n_2)) = -n_1 \cos \alpha_1 \Delta \alpha_1 \quad (29)$$

is derived.

The relations given by the expressions (29) and (28) can be combined and rewritten as follows:

$$-\tan \alpha_1 \left( \frac{\Delta n_1}{n_1} - \frac{\Delta n_2}{n_2} \right) = \Delta \alpha_1 = -\Delta \theta_2 \quad (30)$$

By taking into account the relation represented by the expression (25), the above expression can be rewritten as follows:

$$-\tan \alpha_1 \left( \frac{\Delta n_1}{n_1} - \frac{\Delta n_2}{n_2} \right) = \frac{\Delta n_1}{n_1} \tan \theta_2 \quad (31)$$

This expression can again be rewritten as follows:

$$\frac{\Delta n_2}{n_2} \tan \alpha_1 = \frac{\Delta n_1}{n_1} (\tan \theta_2 + \tan \alpha_1) \quad (32)$$

The above expression defines the condition for which the output beam angle undergoes no change irrespective of changes in the wavelength of the light beam.

The medium or material which has the refractive index and the dispersion of refractivity which satisfies the above condition is available for use for the reason mentioned below.

Assuming, for example, that $\theta_2 = \alpha_1$ and taking into consideration that $n_1 \approx n_2$, the following relation applies valid.

$$2 \Delta n_1 \approx \Delta n_2$$

On the basis of data of commercially available glass of optical quality provided by Ohara Optical Glass Manufacturing Co., Ltd., the value of $\Delta n_1 / \Delta n_2$ can be selected from the range defined below.

$$(1/6) < (\Delta n_1 / \Delta n_2) < 1$$

Thus, it is apparent that the optical system which satisfies the condition given by the expression (32) can be implemented for practical purpose.

The structure of the complex prism 10 which is constituted by a pair of prisms 10A and 10B, as described hereinbefore, involves increasing in the number of the refracting faces, which in turn means that loss due to reflection is increased. In order to minimize the loss, the materials constituting the two prisms should be so selected that the condition $n_1 \simeq n_2$ is satisfied at a predetermined wavelength of the light beam.

By way of example, in case of the first prism 10A of the complex prism 10 is made of optical glass commerically available from Ohara Optical Glass Manufacturing Co., Ltd. in Japan under the trade name "LaK10" and exhibiting the refractive index ($n_1$) of 1.70889 at the wavelength ($\lambda$) of 830 nm while the second prism 10B is made of optical glass material commercially available from the same company under trade name "SF11" of which refractive index ($n_2$) is 1.763066 at the wavelength ($\lambda$) of 830 nm, wherein angle $\gamma$ (see FIG. 3) is selected equal to 33.40° or alternatively $\theta_1=64.56°$, it is determined that $\theta_2=31.90°$, $\alpha_1=40.70°$ and that $\alpha_2=32.90°$. In this case, the changes $\Delta n_1$ and $\Delta n_2$ in the refractive indexes (i.e. dispersion of refractivity) brought about by the change of the wavelength $\lambda$ from 800 nm to 860 nm are $-0.001759$ and $-0.003128$, respectively, which apparently satisfies the aforementioned condition given by the expression (32).

In reality, it has been established that the change of the output angle is only 0.000708° when the wavelength changes from 830 nm to 800 nm, while the change of the output angle is as small as 0.000717° when the wavelength changes from 830 nm to 860 nm. It is apparent that the change of the output angle is reduced by one order of magnitude as compared with that of the hitherto known prism. At that time, the beam diameter is magnified by a factor of 2.19 in the direction in which the output angle is changed. Accordingly, when the light beam of an elliptical cross section having a diametrical ratio of 1:2 is employed, the light beam is modified in the cross-sectional shape to the diametrical ratio of 2.19:2, which approximates to a true circle.

Figure 4:
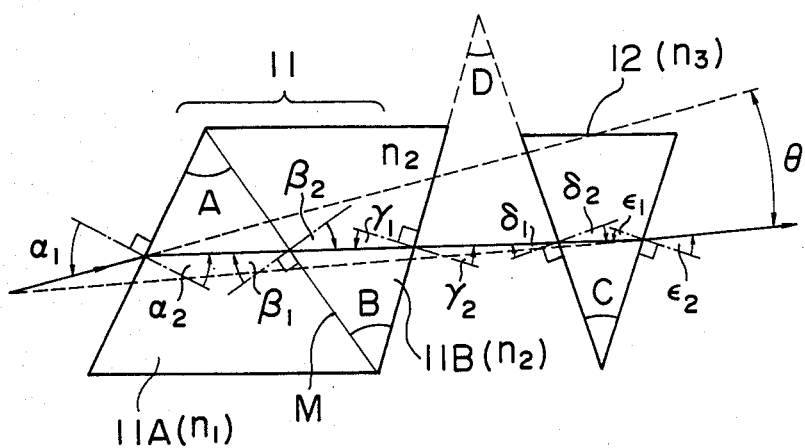
FIGS. 4 and 5 are views showing, respectively, optical prism systems according to further embodiments of the invention.

Next, description will be made of an optical system in which the complex prism constituted by bonding a pair of prisms made of materials having mutually different dispersions of refractivity is combined with a unitary or simplex prism. FIG. 4 shows an optical system according to another embodiment of the present invention. In the figure, a reference numeral 11 denotes a complex prism constituted by bonding together a first prism 11A having an apex angle A and made of a material having a refractive index $n_1$ and dispersion of refractivity $\Delta n_1$ and a second prism 11B having an apex angle B and made of a material exhibiting a refractive index $n_2$ and dispersion of refractivity $\Delta n_2$. A numeral 12 denotes a third unitary or simplex prism having an apex angle C and made of a material having a refractive index $n_3$. In the illustrated optical system, the first prism 11A is bonded to the second prism 11B with the second face of the former being in opposition to and in physical contact with the first face of the latter. The light beam is so introduced as to impinge on the first face of the first prism 11A at an incident angle $\alpha_1$ and transmit through the bonded faces of both prisms to leave the second prism 11B at the second face thereof which is oriented at an angle D relative to the first face of the third simplex prism 3 so that the light beam is incident on the first face of the third simplex prism 12 and exits from the second face thereof at the output angle $\epsilon_2$. In this connection, it should be mentioned that the apex angles A, B and C of the first, second and third prisms are angles formed between the first and second faces thereof, respectively.

In the arrangement mentioned above, it follows from the Snell's law that $$\sin \alpha_1 = n_1 \sin \alpha_2 \quad (33)$$

$$n_1 \sin \beta_1 = n_2 \sin \beta_2 \quad (34)$$

$$n_2 \sin \gamma_1 = \sin \gamma_2 \quad (35)$$

$$\sin \delta_1 = n_3 \sin \delta_2 \quad (36)$$

$$n_3 \sin \epsilon_1 = \sin \epsilon_2 \quad (37)$$

and that $$A = \alpha_2 + \beta_1 \quad (38)$$

$$B = \beta_2 + \gamma_1 \quad (39)$$

$$C = \delta_2 + \epsilon_1 \quad (40)$$

$$D = \gamma_2 + \delta_1 \quad (41)$$

$$\theta = \alpha_1 = \epsilon_2 - A + B + C - D \quad (42)$$

When changes of refractive indexes $n_1$, $n_2$ and $n_3$ and the angles $\alpha_1$, $\alpha_2$, $\beta_1$, $\beta_2$, $\gamma_1$, $\gamma_2$, $\delta_1$, $\delta_2$, $\epsilon_1$, $\epsilon_2$ and so forth brought about in accompaniement with a change $\Delta\lambda$ in the wavelength of the incident light beam are represented by $\Delta n_1$, $\Delta n_2$, $\Delta n_3$, and $\Delta\alpha_1$, $\Delta\alpha_2$, $\Delta\beta_1$, $\Delta\beta_2$, $\Delta\gamma_1$, $\Delta\gamma_2$, $\Delta\delta_1$, $\Delta\delta_2$, $\Delta\epsilon_1$, $\Delta\epsilon_2$ and so forth, respectively, with the assumption that the angles A, B, C and D as well as the incident angle $\alpha_1$ are invariable, the expression (42) can be rewritten as follows in light of the expression (33). That is, $$0 = \Delta n_1 \sin \alpha_2 + n_1 \cos \alpha_2 \cdot \Delta\alpha_2 \quad (43)$$

$$\Delta n_1 \sin \beta_1 + n_1 \cos \beta_1 \cdot \Delta\beta_1 = \Delta n_2 \sin \beta_2 + n_2 \cos \beta_2 \cdot \Delta\beta_2 \quad (44)$$

$$\Delta n_2 \sin \gamma_1 + n_2 \cos \gamma_1 = \cos \delta_2 \cdot \Delta\gamma_2 \quad (45)$$

$$\cos \delta_1 \cdot \Delta\delta_1 = \Delta n_3 \sin \delta_2 + n_3 \cos \delta_2 \cdot \Delta\delta_2 \quad (46)$$

$$\Delta n_3 \sin \epsilon_1 + n_3 \cos \epsilon_1 \cdot \Delta\epsilon_1 = \cos \epsilon_2 \cdot \Delta\epsilon_2 \quad (47)$$

$$0 = \Delta\alpha_2 + \Delta\beta_1 \quad (48)$$

$$0 = \Delta\beta_2 + \Delta\gamma_1 \quad (49)$$

$$0 = \Delta\delta_2 + \Delta\epsilon_1 \quad (50)$$

$$0 = \Delta\gamma_2 + \Delta\delta_1 \quad (51)$$

$$\Delta\theta = \Delta\alpha_1 + \Delta\epsilon_2 \quad (52)$$

From the expression (43), it follows:

$$\Delta\alpha_2 = =(\Delta n_1/n_1) \tan \alpha_2 \quad (53)$$

By determining $\Delta\beta_1$ in accordance with the expressions (53) and (48) and rewriting the expression (44) by taking into account the determined $\Delta\beta_1$, $$\Delta\beta_2 = \frac{\Delta n_1}{n_2} \frac{\sin A}{\cos\alpha_2 \cos\beta_2} - \frac{\Delta n_2}{n_2} \tan\beta_2 \quad (54)$$

Next, $\Delta\gamma_1$ is determined on the basis of the expression (54) and (49). Then, taking into account the determined $\Delta\gamma_1$, the expression (45) can be rewritten as follows:

$$(55)$$

-continued $$\Delta\gamma_2 = \frac{\cos\gamma_1}{\cos\gamma_2}\left[\Delta n_2\tan\gamma_1 + \frac{1}{\cos\beta_2}\left(\Delta n_2\sin\beta_2 - \frac{\Delta n_1\sin A}{\sin\alpha_2}\right)\right]$$

Further, $\Delta\delta_1$ is determined from the expressions (55) and (51) and placed in the expression (46), which then can be rewritten as follows:

$$\Delta\epsilon_1 = \frac{\Delta n_3}{n_3}\tan\delta_2 + \frac{1}{n_3}\frac{\cos\delta_1}{\cos\delta_2}\frac{\cos\gamma_1}{\cos\gamma_2} \times \quad (56)$$

$$\left[\Delta n_2\tan\gamma_1 - \frac{1}{\cos\beta_2}\left(\Delta n_1\frac{\sin A}{\cos\alpha_2} - \Delta n_2\sin\beta_2\right)\right]$$

Since it is necessary that $\Delta\epsilon_2=0$ irrespective of the change in the wavelength $\lambda$, it follows from the expression (47) that $$\Delta n_3\sin\epsilon_1 + n_3\cos\epsilon_1\cdot\Delta\epsilon_1 = 0 \quad (57)$$

Accordingly, from the expressions (56) and (57), $$\Delta n_3(\tan\epsilon_1 + \tan\delta_2) + \frac{\cos\delta_1}{\cos\delta_2}\frac{\cos\gamma_1}{\cos\gamma_2}\left[\Delta n_2\tan\gamma_1 - \frac{1}{\cos\beta_2}\left(\Delta n_1\frac{\sin A}{\cos\alpha_2} - \Delta n_2\sin\beta_2\right)\right] = 0 \quad (58)$$

Thus, it is established that in the arrangement shown in FIG. 4, the output beam angle $\epsilon_2$ remains unchanged irrespective of the change in the wavelength $\lambda$ of the light beam so far as the individual angles satisfy the conditions given by the expression (58).

It should here be added that the prism system can further be simplified when the three conditions mentioned below are satisfied.

Condition 1: Output light beam is parallel with the incident light beam ($\theta=0$).
Condition 2: Output light beam leaves the exit face of the third simplex prism in the direction perpendicular thereto ($\gamma_2 = \epsilon_2 = 0$).
Condition 3: $n_1 = n_3$ By taking the above conditions into consideration the expressions (33) to (42) can be rewritten as follows:

$$\sin\alpha_1 = n_1\sin\alpha_2 \quad (59)$$

$$n_1\sin\beta_1 = n_2\sin B \quad (60)$$

$$\sin D = n_1\sin C \quad (61)$$

$$A = \alpha_2 + \beta_1 \quad (62)$$

$$B = \beta_2 \quad (63)$$

$$C = \delta_2 \quad (64)$$

$$D = \delta_1 \quad (65)$$

$$0 = \alpha_1 - A + B + C - D \quad (66)$$

The expression (58) also can be rewritten as follows:

$$\Delta n_1\sin C + \cos D\left(\Delta n_2\tan B - \frac{\Delta n_1\sin A}{\cos\alpha_2\cos B}\right) = 0 \quad (67)$$

By combining the expressions (66) and (67) to eliminate A, $$\tan B = \frac{\left(\frac{\Delta n_2}{\Delta n_1}\right)\sin(\alpha_1 + C - D)}{\cos\alpha_2} - \frac{\sin C}{\cos D} \quad (68)$$

When A and $\beta_1$ are eliminated through combination of the expressions (62), (66) and (67), it follows:

$$\tan B = \frac{\sin(\alpha_1 - \alpha_2 + C - D)}{\frac{n_2}{n_1} - \cos(\alpha_1 - \alpha_2 + C - D)} \quad (69)$$

In summary, the prism system which can satisfy the aforementioned conditions 1, 2 and 3 and the condition that the change in the output beam angle $\Delta\epsilon_2$ be zero has to satisfy the relations mentioned below.

$$\sin\alpha_1 = n_1\sin\alpha_2 \quad (70a)$$
$$\sin D = n_1\sin C \quad (70b)$$

$$\frac{\left(\frac{\Delta n_2}{\Delta n_1}\right)\sin(\alpha_1 + C - D)}{\cos\alpha_2} - \frac{\sin C}{\cos D} = \frac{\sin(\alpha_1 - \alpha_2 + C - D)}{\frac{n_2}{n_1} - \cos(\alpha_1 - \alpha_2 + C - D)} \quad (70c)$$

Since the expressions (70a), (70b) and (70c) are three simultaneous equations including four variables, it is possible to determine values of three variables for a given value of one variable.

The prism materials exhibiting the refractive indexes and dispersions of refractivity which meet the conditions mentioned above are commercially available. For example, the first prism 11A of the complex prism 11 may be made of a material commercially available from Ohara Optical Glass Manufacturing Co., Ltd. in Japan under the trade name "LaSF016", while the second prism 11B may be made of a material "SF11" also available from the same company, and the third simplex prism 12 may be made of the material "LaSF016", refractive indexes of these media are listed in the following table 2.

TABLE 2

|  | LaSF016 | SF-11 |
|---|---|---|
| $\lambda = 830$ nm | $n_1 = 1.760298$ | $n_2 = 1.763066$ |
| $\lambda = 800$ nm | $n_{11} = 1.761312$ | $n_{21} = 1.764710$ |
| $\lambda = 860$ nm | $n_{12} = 1.759361$ | $n_{22} = 1.761582$ |
| $\Delta n_i = n_{i2} - n_{i1}$ | $\Delta n_1 = -0.001951$ | $\Delta n_2 = -0.003128$ |

Figure 5:
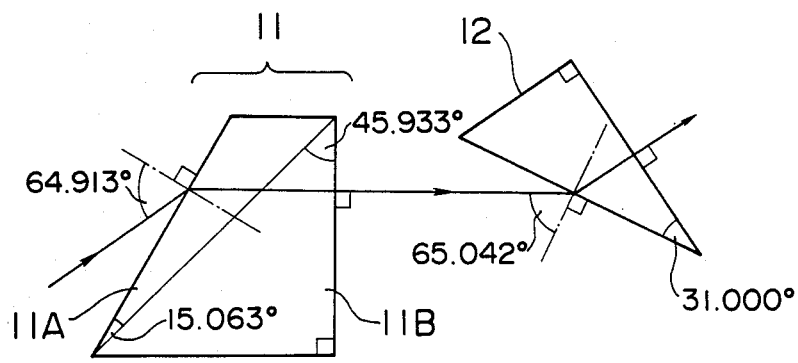

It is assumed that the magnification ratio M of beam diameter is to be about 2. On the assumption, when $n = n_1$ (LaSF016), it follows from the expression (3) that $\phi = C = 30.871°$. Thus, the apex angle C may be selected equal to 31.00°. Then, from the expression (70b), it is determined that D=65.042°. By solving the expressions (70a) and (70c) simultaneously for the known values of the angles C and D, it is established that $\alpha_1=64.913°$. Accordingly, from the expression (68), B=−45.933°, while A=−15.063° from the expression (66). A prism system designed in accordance with the values thus obtained is illustrated in FIG. 5.

In the prism system shown in FIG. 4, the magnification ratio M of beam diameter is given by $$M = \frac{\cos\alpha_1}{\cos\alpha_2} \cdot \frac{\cos\beta_1}{\cos\beta_2} \cdot \frac{\cos\gamma_1}{\cos\gamma_2} \cdot \frac{\cos\delta_1}{\cos\delta_2} \cdot \frac{\cos\epsilon_1}{\cos\epsilon_2} \qquad (71)$$

In the case of the numerical example mentioned above, the ratio M equals 4.1. For solving the expressions (70), one of the variables can be set at an appropriate value. Accordingly, by determing $\phi(=C)$ for the desired value of M in accordance with the expression (3) and solving the expressions (70) for the value of $\phi$ now known, it is possible to implement the optical prism system whose output beam angle can remain invariable irrespective of change in the wavelength of the light beam for a given value of the magnification (or diminution) ratio.

In the case of the numerical example mentioned above, the change in the output beam angle $\Delta\epsilon_2$ is only 0.0000640° for the change in the wavelength $\Delta\lambda=4$ nm. This change of the output beam angle is about 1/40 of that of the prior art optical system, which tells how advantageous the present invention is.

In the foregoing description, the complex prism is constituted by bonding together the first and second elementary prisms. It is however important to note that so far as the second face of the first prism (11A) is maintained in parallel with the first face of the second prism (11B), utterly the same effect can be accomplished even when a single or multiple flat layers of other material are interposed between the second face of the first prism and the first face of the second prism. In that case, the material of the interposed layer or layers should preferably exhibit high transmittivity. Of course, a layer of air may be interposed between the first and second prisms. Further, it goes without saying that the invention is not restricted to the optical system composed of the complex prism and the simplex prism but may equally be embodied as the optical system constituted by a combination of complex prisms.

Further, in the optical system using prisms according to this invention, the same operation or function as described above can be obtained even when light is made incident from the direction which is reverse to the above described direction.

In the following, description will be made of an optical information processing apparatus to which the optical system according to the invention can be effectively applied.

Figure 6:
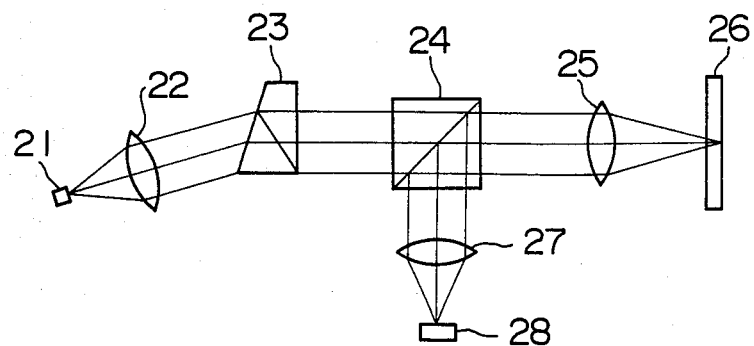
FIG. 6 shows in a block diagram an optical disk apparatus in which the prism system illustrated in FIG. 3 is employed.

FIG. 6 is a block diagram showing schematically a general arrangement of a write-once type optical disk apparatus according to an embodiment of the present invention. In the figure, a reference numeral 21 denotes a semiconductor laser, 22 denotes a lens system, and 23 denotes a complex prism for shaping the light beam, which prism may be realized in the structure shown in FIG. 3. A numeral 24 denotes a beam splitter, 25 and 27 denote lenses, respectively, 26 denotes an optical disk, and 28 denotes a photo-detector.

The optical disk apparatus of the arrangement mentioned above operates in the manner which will be described below.

A laser light beam of an elliptical shape in cross section emitted from the semiconductor laser 21 is collimated by the lens 22 to a parallel light beam and introduced to the prism (complex prism) 23 which is characterized in that the output beam from the prism undergoes no change in the output beam angle irrespective of changes in the wavelength of laser light. The light beam leaving the prism 23 is guided to impinge on the optical disk 26 for irradiation thereof through the beam splitter 24 and the lens 25. In the recording mode, information is recorded on the optical disk in the form of pits formed in a recording film deposited on the disk under irradiation of the laser beam. On the other hand, in the case of the reproducing (playback) mode, a reflected light modulated in correspondence to the information as recorded is picked up by the beam splitter 24 and received by the photo-detector 28 to be converted into a corresponding electrical signal. Since the operation described above is essentially same as that of any conventional optical disk apparatus, any further description will be unnecessary.

The arrangement of the embodiment mentioned above is particularly effective for such applications where change in the wavelength is brought about due to the change in the power of the semiconductor laser between the reading or reproducing operation and the writing or recording operation as in the case of the optical disk apparatus of write-once and erasable type.

Figure 7:
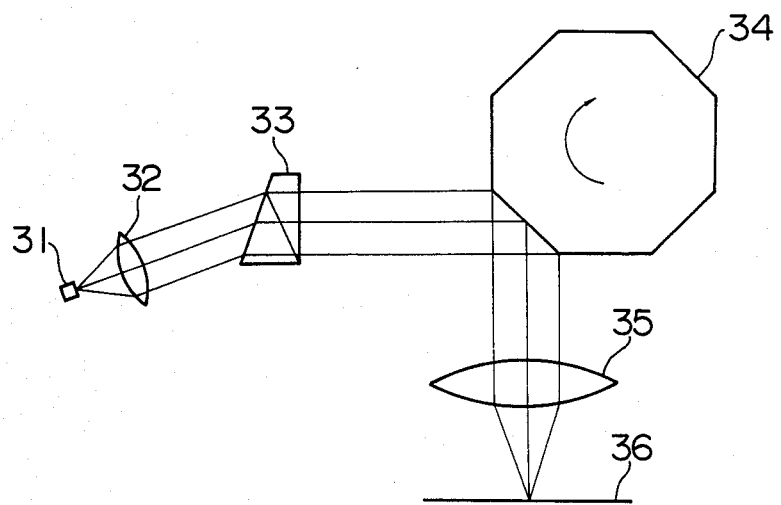
FIG. 7 is a block diagram showing schematically an arrangement of a laser printer in which the optical prism system shown in FIG. 3 is employed.

FIG. 7 is a block diagram showing schematically an arrangement of a laser printer according to another embodiment of the present invention. In the figure, a reference numeral 31 denotes a semiconductor laser, 32 denotes a lens, and 33 denotes a complex prism for shaping the light beam, which prism may be implemented in such a structure as shown in FIG. 4. A numeral 34 denotes a polygon mirror, 35 denotes a F$\theta$-lens, and 36 denotes a photoconductive drum.

In the laser printer of the arrangement as illustrated, the laser beam of an elliptical shape in cross section emitted by the semiconductor laser 31 is collimated by the lens 32 to a parallel beam which is then shaped through the complex prism 33 to be used for scanning the photoconductive drum 36 by way of the polygon mirror 34 and the F$\theta$-lens 35. In the case of the hitherto known laser printer, there may arise such a situation in which change in the wavelength of laser light brings about a change in the output beam angle, involving thus distortions in the patterns and characters imprinted on the photo-conductive drum 36 to a disadvantage. This problem can be solved quite satisfactorily by using the complex prism 33 according to the teaching of the invention.

Figure 8:
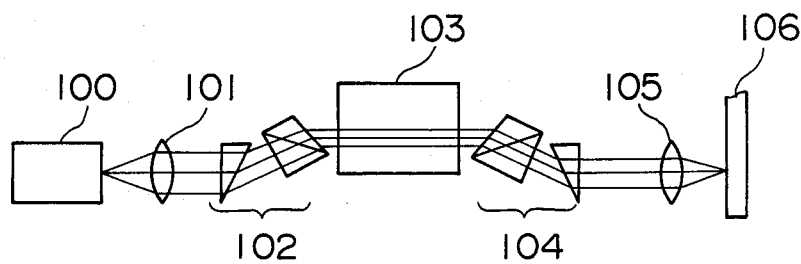
FIG. 8 is a block diagram showing schematically an arrangement of an optical disk apparatus in which the optical prism system shown in FIG. 5 is used.

FIG. 8 is a block diagram showing schematically an erasable type optical disk apparatus according to still another embodiment of the invention, in which the prism system of the structure shown in FIG. 5 is employed. In the figure, a numeral 100 denotes a semiconductor laser, 101 denotes a lens, 102 and 104 denote, respectively, first and second optical systems each of the structure illustrated in FIG. 5, 103 denotes an acousto-optic modulator (AOM), 105 denotes a lens, and 106 denotes an optical disk.

The optical disk apparatus of the above arrangement operates in the manner described below.

Laser light emitted from the semiconductor laser 100 is collimated to a parallel beam by the lens 101 and converted by the first prism system 102 to a light beam of a width or diameter smaller than the effective aperture of the AOM 103 to be subsequently applied to the latter. The prism system 102 characteristically features the insusceptibility to change in the output beam angle irrespective of any change in the wavelength of laser light, as described hereinbefore. The light beam exiting from the AOM 103 is shaped into the beam of a circular shape in cross section by the second prism system 104 and focussed onto the disk 106 by means of the focussing lens 105. In the reproducing mode, the reflected light from the optical disk 106 is picked up by a beam splitter (not shown) interposed between the shaping prism system 104 and the focussing lens 105 to be received by a photo-detector (not shown) for reading out the recorded information. In the case of the conventional optical disk system of this sort, change in the output angle of a beam exiting from a prism due to change in the wavelength of laser light makes appearance in the form of positional change or deviation of the focussed light spot on the optical disk, as described hereinbefore. The prism system according to the invention is very effective for preventing or suppressing such undesirable positional change of the light spot. Additionally, because of the parallelism existing between the incident light beam and the output light beam, structure as well as the optical head can be simplified and facilitated, to another advantage.

Figure 9:
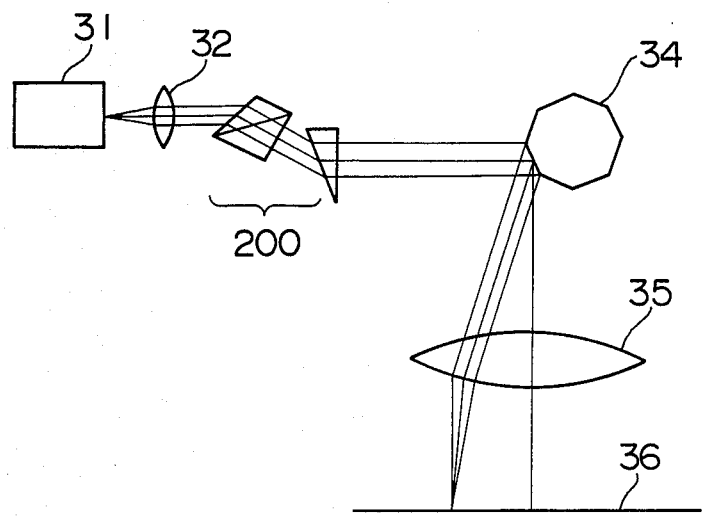
FIG. 9 is a block diagram showing schematically an arrangement of a laser printer in which the optical prism system shown in FIG. 5 is employed.

FIG. 9 is a block diagram showing schematically an arrangement of a laser printer according to a further embodiment of the present invention, in which the prism system of the structure shown in FIG. 5 is employed. In the figure, 31, 32, 34, 35 and 36 denote, respectively, like elements shown in FIG. 7 attached with the same reference numerals, and 200 denotes the beam shaping prism optic. The laser printer operates in substantially same manner as the one shown in FIG. 7. Accordingly, any further description will be unnecessary.

As can now be appreciated from the foregoing description, there can be realized, according to the present invention the, a prism optic system which includes a complex prism constituted by combination of at least two prisms made of materials differing in respect to the dispersion of refractivity and which undergoes no appreciable change in the geometric optical properties thereof irrespective of change in the wavelength of the light beam, to great advantage. When the prism optic or system is employed in a optical information processing apparatus, the latter can be made insusceptible to the influence of changes in the wavelength of the light source as employed.

We claim:

1. An optical system for converting cross-sectional shape of a light beam by making use of refraction of prism optics, comprising a complex prism unit including first and second prisms made of materials having mutually different dispersions of refractivity and so selected that the output beam angle of the light beam leaving said optical system remains substantially constant irrespective of changes in the wavelength of said light beam, said complex prism being disposed in the same position for any wavelength of said light beam;
    wherein said complex prism unit is constituted by bonding a second face of said first prism and a first face of said second prism to each other, said light beam incident on a first face of said first prism and transmitting through said second face of first prism and said first face of said second prism to be outputted from a second face of said second prism in a direction perpendicular to said second face of said second prism.

2. An optical information processing apparatus including at least a semiconductor laser for recording information, collimating optics for collimating a light beam emitted from said semiconductor laser, first beam-shape converting optics for converting the cross-sectional shape of the light beam output from said collimating optics and focussing optics for focussing the light beam output from said beam-shape converting optics on an optical disk having a recording film for recording by irradiation of light, wherein said beam-shape converting optics comprises an optical prism system which includes a complex prism unit including first and second prisms made of materials differing from each other with respect to dispersion of refractivity, said complex prism being disposed in the same position for any wavelength of said light beam;
    wherein said complex prism unit is constituted by bonding a second face of said first prism and a first face of said second prism to each other, said light beam being incident on a first face of said first prism and transmitting through said second face of said first prism and said first face of said second prism to be outputted from a second face of said second prism in a direction perpendicular to said second face of said second prism.

3. An optical information processing apparatus including at least a semiconductor laser for recording information, collimating optics for collimating a light beam emitted from said semiconductor laser, first beam-shape converting optics for converting the cross-sectional shape of the light beam output from said collimating optics and focussing optics for focussing the light beam output from said beam-shape converting optics on an optical disk having a recording film for recording by irradiation of light, wherein said beam-shape converting optics comprises an optical prism system which includes a complex prism unit including first and second prisms made of materials differing from each other with respect to dispersion of refractivity, said complex prism being disposed in the same position for any wavelength of said light beam;
    wherein said complex prism unit is constituted by bonding a second face of said first prism and a first face of said second prism to each other, the light beam being incident on a second face of said second prism along a direction perpendicular to said second face of said second prism and transmitting through said first face of said second prism and said second face of said first prism to be outputted from a first face of said first prism.

4. An optical system for converting cross-sectional shape of a light beam by making use of refraction of prism optics, comprising a complex prism unit constituted by at least first and second prisms made of materials having mutually different dispersions of refractivity and so selected that the output beam angle of the light beam leaving said optical system can remain substantially constant irrespective of possible change in the wavelength of said light beam, said complex prism unit being constituted by bonding a second face of said first prism and a first face of said second prism to each other, said light beam being incident on a first face of said first prism and transmitting through said second face of said first prism and said first face of said second prism to be outputted from a second face of said second prism in a direction perpendicular to said second face of said second prism, wherein said complex prism unit satisfies the condition given by;

$$(\Delta n_2/n_2) \tan \alpha_1 = (\Delta n_1/n_1)(\tan \theta_2 + \tan \alpha_1)$$

where
  $\Delta n_1, \Delta n_2$: dispersions of refractivity,
  $n_1, n_2$: refractive indexes at a predetermined wavelength,
  $\theta_2$: angle of refraction of said first prism at said first face thereof, and
  $\alpha_1$: angle of refraction of said first prism at said second face thereof.

5. An optical system according to claim 4, wherein said first and second prisms are made of materials exhibiting substantially equal refractive indexes at said predetermined wavelength.

6. An optical system for converting cross-sectional shape of a light beam by making use of refraction of prism optics, comprising a complex prism unit constituted by at least first and second prisms made of materials having mutually different dispersions of refractivity and so selected that the output beam angle of the light beam leaving said optical system can remain substantially constant irrespective of possible change in the wavelength of said light beam, said complex prism unit being constituted by bonding a second face of said first prism and a first face of said second prism to each other, the light beam being incident on a second face of said second prism along a direction perpendicular to said second face of said second prism and transmitting through said first face of said second prism and said second face of said first prism to be outputted from a first face of said first prism, wherein said complex prism unit satisfies the condition given by:

$$(\Delta n_2/n_2) \tan \alpha_1 = (\Delta n_1/n_1)(\tan \theta_2 + \tan \alpha_1)$$

where
  $\Delta n_1, \Delta n_2$: dispersion of refractivity,
  $n_1, n_2$: refractive indexes at a predetermined wavelength,
  $\theta_2$: angle of refraction of said first prism at said first face thereof, and
  $\alpha_1$: angle of refraction of said first prism at said second face thereof.

7. An optical system according to claim 6, wherein said first and second prisms are made of materials exhibiting substantially equal refractive indexes at said predetermined wavelength.

8. An optical system for converting cross-sectional shape of a light beam by making use of refraction of prism optics, comprising a complex prism unit including at least first and second prisms made of materials having mutually different dispersions of refractivity and a third simplex prism made of a single material and so selected that the output beam angle of the light beam leaving said optical system can remain substantially constant irrespective of possible change in the wavelength of said light beam;
  wherein said complex prism is constituted by bonding a second face of said first prism and first face of said second prism to each other, and said light beam incident on a first face of said first prism, transmits through said bonded faces, exists from a second face of said second prism, impinges on a first face of said third prism and exits from a second face of said third prism, and wherein arrangement is made such that the following condition is satisfied;

$$\Delta n_3(\tan\epsilon_1 + \tan\delta_2) + \frac{\cos\delta_1}{\cos\delta_2} \cdot \frac{\cos\gamma_1}{\cos\gamma_2} \left[ \Delta n_2 \tan\gamma_1 - \frac{1}{\cos\beta_2} \left( \Delta n_1 \frac{\sin A}{\cos\alpha_2} - \Delta n_2 \sin\beta_2 \right) \right] = 0$$

wherein $\alpha_2$ and $\theta_1$ represent, respectively, angles of the first and second faces of said first prism, $\beta_2$ and $\gamma_1$ represent, respectively, angles of the first and second faces of said second prism, $\gamma_2$ represents an angle at which the light beam exits from the second face of said second prism, $\delta_2$ and $\epsilon_1$ represent, respectively, angles of the first and second faces of said third prism, A represents an angle formed between the first and second faces of said first prism, $\Delta n_i$ (i=1, 2, 3) represents dispersions of refractivity of materials constituting said first, second and third prisms, respectively, and $n_i$ (i=1, 2, 3) represents refractive indexes of said materials, respectively, at the predetermined wavelength of said light beam.

9. An optical system according to claim 8, wherein arrangement is made such that the following condition is satisfied;

$$\alpha_1 - \epsilon_2 - A + B + C - D = 0$$

wherein $\alpha_1$ represents the angle of incidence of the light beam at the first face of said first prism, B represents an angle formed between the first and second faces of said second prism, C represents an angle formed between the first and second faces of said third prism, D represents an angle formed between the second face of said second prism and the first face of said third prism and $\epsilon_2$ represents an angle at which the light beam exits from said third prism.

10. An optical information processing apparatus including at least a light source for recording information, collimating optics for collimating a light beam emitted from said light source, first beam-shape converting optics for converting the cross-sectional shape of the light beam output from said collimating optics and focussing optics for focussing the light beam output from said beam-shape converting optics on a predetermined surface, said beam-shape converting optics comprising an optical prism system which includes a complex prism unit constituted by at least first and second prisms made of materials differing from each other with respect to dispersion of refractivity, said complex prism unit being constituted by bonding a second face of said first prism and a first face of said second prism ot each other, said light beam being incident on a first face of said first prism and transmitting through said second face of said first prism and said first face of said second prism to be output from a second face of said second prism in a direction perpendicular to said second face of said second prism, wherein said complex prism unit satisfies the condition given by;

$(\Delta n_2/n_2) \tan \alpha_1 = (\Delta n_1/n_1)(\tan \theta_2 + \tan \alpha_1)$ where $\Delta n_1, \Delta n_2$: dispersions of refractivity, $n_1, n_2$: refractive indexes at a predetermined wavelength, $\theta_2$: angle of refraction of said first prism at said first face thereof, and $\alpha_1$: angle of refraction of said first prism at said second face thereof.

11. An optical information processing apparatus according to claim 10, wherein said predetermined surface is an optically recordable film formed on an optical disk.

12. An optical information processing apparatus according to claim 10, wherein said predetermined surface is a photoconductive drum.

13. An optical information processing apparatus according to claim 10, wherein said light source comprises a semiconductor laser.

14. An optical information processing apparatus including at least a light source for recording information, collimating optics for collimating a light beam emitted from said light source, first beam-shape converting optics for converting the cross-sectional shape of the light beam output from said collimating optics and focussing optics for focussing the light beam output from said beam-shape converting optics on a predetermined surface, said beam-shape converting optics comprising an optical prism system which includes a complex prism unit constituted by at least first and second prisms made of materials differing from each other with respect to dispersion of refractivity, said complex prism unit being constituted by bonding a second face of said first prism and a first face of said second prism to each other, the light beam being incident on a second face of said second prism along a direction perpendicular to said second face of said second prism and transmitting through said first face of said second prism and said second face of said first prism to be output from a first face of said first prism, wherein said prism complex prism unit satisfies the condition given by;

$(\Delta n_2/n_2) \tan \alpha_1 = (\Delta n_1/n_1)(\tan \theta_2 + \tan \alpha_1)$ where $\Delta n_1, \Delta n_2$: dispersion of refractivity, $n_1, n_2$: refractive indexes at a predetermined wavelength, $\theta_2$: angle of refraction of said first prism at said first face thereof, and $\alpha_1$: angle of refraction of said first prism at said second face thereof.

15. An optical information processing apparatus according to claim 14, wherein said predetermined surface is an optically recordable film formed on an optical disk.

16. An optical information processing apparatus according to claim 14, wherein said predetermined surface is a photoconductive drum.

17. An optical information processing apparatus according to claim 14, wherein said light source comprises a semiconductor laser.

18. An optical information processing apparatus including at least a light source for recording information, collimating optics for collimating a light beam emitted from said light source, first beam-shape converting optics for converting the cross-sectional shape of the light beam output from said collimating optics and focussing optics for focussing the light beam output from said beam-shape converting optics on a predetermined surface, said beam-shape converting optics comprising an optical prism system which includes a complex prism unit constituted by at least first and second prisms made of materials differing from each other with respect to dispersion of refractivity and a third simplex prism made of a single material;

wherein said complex prism is constituted by bonding a second face of said first prism and a first face of said second prism to each other, and said light beam incident on a first face of said first prism, transmits through said bonded faces, exits from a second face of said second prism, impinges on a first face of said third prism and exits from a second face of said third prism, and wherein arrangement is made such that the following condition is satisfied;

$$\Delta n_3(\tan\epsilon_1 + \tan\delta_2) + \frac{\cos\delta_1}{\cos\delta_2} \cdot \frac{\cos\gamma_1}{\cos\gamma_2}\left[\Delta n_2\tan\gamma_1 - \frac{1}{\cos\beta_2}\left(\Delta n_1\frac{\sin A}{\cos\alpha_2} - \Delta n_2\sin\beta_2\right)\right] = 0$$

wherein $\alpha_2$ and $\beta_1$ represent, respectively, angles of the first and second faces of said first prism, $\beta_2$ and $\gamma_1$ represent, respectively, angles of the first and second faces of said second prism, $\gamma_2$ represents an angle at which the light beam exits from the second face of said second prism, $\delta_2$ and $\epsilon_1$ represent, respectively, angles of the first and second faces of said third prism, A represents an angle formed between the first and second faces of said first prism, $\Delta n_i$ (i=1, 2, 3) represents dispersions of refractivity of materials constituting said first, second and third prisms, respectively, and $n_i$ (i=1, 2, 3) represents refractive indexes of said materials, respectively, at the predetermined wavelength of said light beam.

19. An optical information processing apparatus according to claim 18, wherein said predetermined surface is an optically recordable film formed on an optical disk.

20. An optical information processing apparatus according to claim 18, wherein said predetermined surface is a photoconductive drum.

21. An optical information processing apparatus according to claim 19, further including an acousto-optic modulator and second beam-shape converting optics for converting the shape of the light beam output from said modulator, said acousto-optic modulator and said second beam-shape converting optics being disposed between said first beam-shape converting optics and said focussing optics.

22. An optical information processing apparatus according to claim 21, wherein said second beam-shape converting optics include a prism system composed of a complex prism constituted by at least two types of prisms made of materials differing from each other with respect to dispersion of refractivity.

23. An optical information processing apparatus according to claim 18, wherein said light source comprises a semiconductor laser.

* * * * *